United States Patent
Bartholomäus et al.

[11] 3,891,145
[45] June 24, 1975

[54] HYDRAULIC TRACKING VALVE FOR TEMPLATES IN MACHINE TOOLS OR THE LIKE

[75] Inventors: Reiner Bartholomäus; Hubert Bernd; Friedel Liedhegener, all of Lohr/Main, Germany

[73] Assignee: G. L. Rexroth GmbH, Lohr/Main, Germany

[22] Filed: July 26, 1973

[21] Appl. No.: 382,711

[30] Foreign Application Priority Data
July 27, 1972 Germany............................ 2236919

[52] U.S. Cl. .................. 137/625.6; 91/461; 251/3; 251/31
[51] Int. Cl. ................. F15b 13/042; B23q 35/18
[58] Field of Search .... 91/37, 216 R, 216 A, 216 B, 91/309, 314, 461; 251/3, 31, 77, 285; 137/625.6, 625.63

[56] References Cited
UNITED STATES PATENTS

| | | | |
|---|---|---|---|
| 2,600,348 | 6/1952 | Walthers | 137/625.6 |
| 2,618,244 | 11/1952 | Rochm | 137/625.63 |
| 3,186,425 | 6/1965 | Weaver | 251/3 X |
| 3,481,231 | 12/1969 | Cormier | 91/364 X |
| 3,722,547 | 5/1973 | Kirstein | 137/625.63 |
| 3,745,883 | 7/1973 | Ward et al. | 91/461 X |
| 3,747,472 | 7/1973 | Knutson | 91/461 X |

FOREIGN PATENTS OR APPLICATIONS

| | | | |
|---|---|---|---|
| 550,030 | 10/1956 | Italy | 137/625.6 |
| 580,111 | 7/1958 | Italy | 137/625.6 |

*Primary Examiner*—Alan Cohan
*Assistant Examiner*—Gerald A. Michalsky
*Attorney, Agent, or Firm*—Michael S. Striker

[57] ABSTRACT

A tracking valve which can be mounted on a tool-supporting carriage in a machine tool and whose main valve member is a spool which is movable axially in a valve body to thereby start a hydraulic motor for the carriage so that the motor can move the carriage relative to a template while simultaneously moving one or more tools relative to a workpiece. The spool has a relatively large surface at one end, a relatively small surface at the other end, and an axial bore for a pilot valve member which is mechanically connected with a follower for the template and is movable by the follower to thereby regulate the pressure of a fluid acting against the larger surface of the spool. The smaller surface of the spool is subjected to a constant fluid pressure and such constant pressure can be assisted by the bias of a spring. The spool has lands which control the flow of fluid to and from the motor by way of ports machined into the housing of the tracking valve and the pilot valve member has two fluid flow regulating surfaces which flank an annular control chamber communicating with a compartment provided in the housing adjacent to the larger surface of the spool. When the pilot valve member is moved axially, either by the follower or by a resetting linkage which can be moved by an indexible cam drum, the fluid flow regulating surfaces change the pressure of fluid in the compartment and thus effect an axial movement of the spool relative to the housing.

2 Claims, 2 Drawing Figures

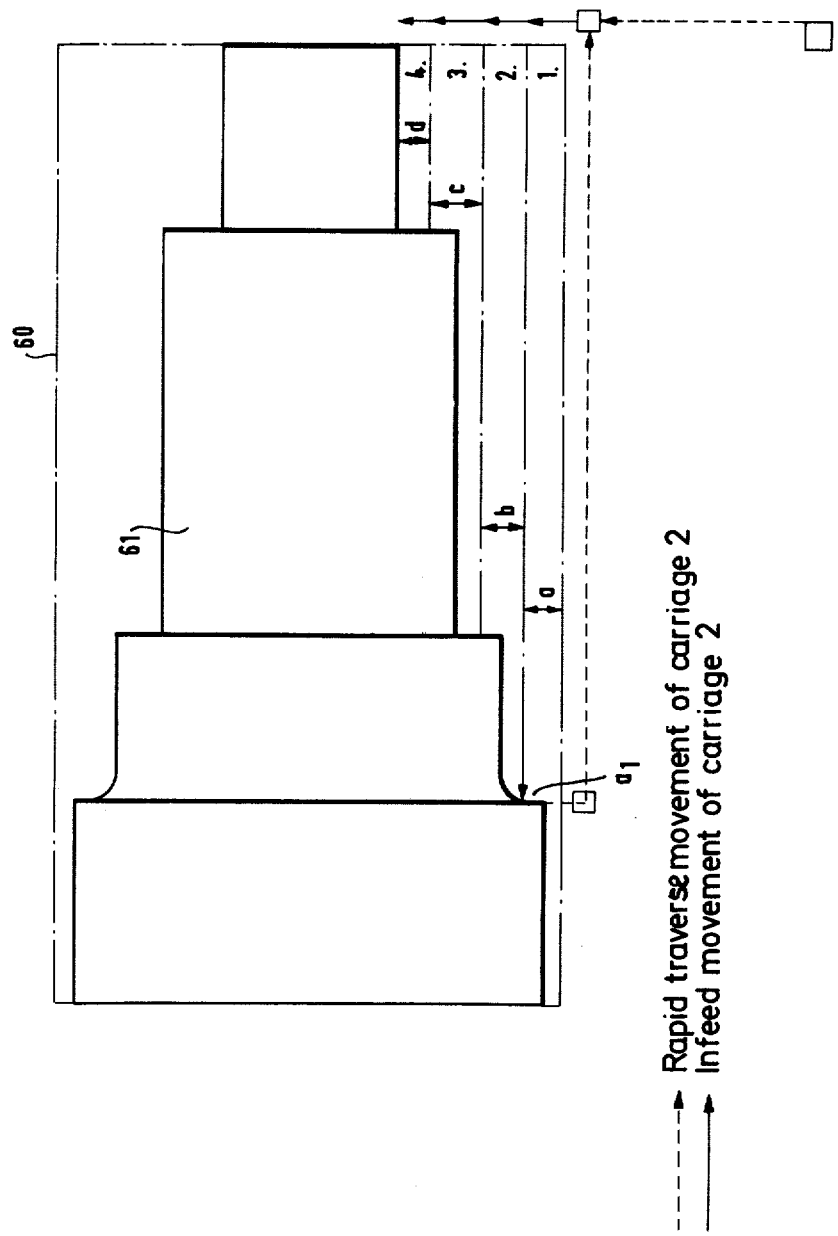

3,891,145

HYDRAULIC TRACKING VALVE FOR TEMPLATES IN MACHINE TOOLS OR THE LIKE

BACKGROUND OF THE INVENTION

The present invention relates to improvements in valves which can be used in so-called follow-up control systems, for example, as tracking valves which determine the infeed movements of a tool is mounted on a slide or carriage of a machine tool.

It is already known to utilize in a machine tool a tracking valve which regulates the movements of a carriage or slide for one or more material removing tools. The valve has a follower which tracks the outline of a pattern or template and causes the carriage to move the tool or tools toward or away from a workpiece or blank in dependency on displacements of the follower. The valve is mounted on the carriage and its follower controls the movements of a main valve member by way of a pilot valve member. The main valve member controls the flow of pressurized fluid to and from a hydraulic motor (e.g., a double-acting cylinder) which serves to move the carriage and the tool or tools thereon relative to the blank.

In presently known tracking valves, the pilot valve member can move the main valve member from a neutral or starting position to first and second operative positions in which the main valve member respectively initiates the movements of the carriage toward and away from the blank. The main valve member is an axially movable spool having plungers or lands which define shoulders serving to regulate the flow of fluid to and from the chambers of the hydraulic motor. The pilot valve member is mounted in an axial bore of the spool and regulates the fluid pressure at both axial ends of the spool. The areas of end faces of the spool are identical and the valve is provided with nozzles which admit pressurized fluid to chambers adjacent to the respective end faces of the spool. When the fluid pressure at one axial end of the spool equals the fluid pressure at the other axial end, the forces acting on the spool neutralize each other and the spool is held against axial movement. If the pilot valve member is shifted (either in response to displacement of the follower by the template or by a spring which biases the pilot valve member), the pressure of fluid issuing from one of the nozzles increases and the spool changes its position to thus effect a movement of the carriage. The arrangement is such that the fluid pressure at one end of the spool increases to the same extent to which the fluid pressure at the other axial end of the spool decreases, or vice versa.

A drawback of the just described conventional tracking valves is that impurities in the fluid tend to clog the orifices of the nozzles whereby the movements of the carriage are not an exact function of the configuration of the template. In fact, such clogging of orifices can result in serious damage to the tool or tools follower, template and/or blank.

SUMMARY OF THE INVENTION

An object of the invention is to provide a tracking valve for use in follow-up control systems wherein the presence of solid contaminants in the fluid does not affect the operation of the valve and wherein the fluid which effects movements of the main valve member between a neutral position and several operative positions need not pass through orifices which tend to become clogged by solid impurities.

Another object of the invention is to provide a tracking valve which can be installed in existing fluid-operated follow-up control systems as a simpler, longer-lasting and less sensitive but more reliable substitute for conventional tracking valves.

A further object of the invention is to provide the tracking valve with a novel and improved combination of main and pilot valve members and with novel and improved resetting means for the pilot valve member.

An additional object of the invention is to provide a tracking valve which is constructed and assembled in such a way that the workpiece, the tool or tools, the valve members and/or the template cannot be damaged as a result of accidental loss of control fluid pressure while the tool or tools move toward or remove material from a workpiece in a machine tool wherein the movements of a slide or carriage for the tool or tools are controlled by a template.

Another object of the invention is to provide a tracking valve which can be operated with small quantities of a control fluid and which is capable of preventing excessive penetration of one or more tools into a workpiece, e.g., into a rotating metallic blank.

The invention is embodied in a hydraulic tracking valve which can be utilized to control the flow of a hydraulic fluid to and from a hydraulic motor (such as a double-acting cylinder), especially a motor which effects the movements of a tool supporting slide or carriage as a function of changes in the outline of a pattern or template. The tracking valve comprises a housing or body which can be mounted on a carriage, a main valve member (e.g., a spool having several plungers or lands provided with annular shoulders which regulate the rate of fluid flow between ports machined into the housing) which is reciprocably mounted in the housing and has a relatively large first radial surface and a smaller second radial surface whereby the two surfaces face in opposite directions so that bodies of a pressurized fluid acting on the first and second surfaces tend to move the main valve member in opposite directions, a follower which is arranged to track the outline of a template, and an axially movable pilot valve member which is mounted in the housing (for example, in an axial bore of the main valve member) and is mechanically connected with the follower so as to be movable in first and second directions and to thereby effect changes in fluid pressure acting against the first surface of the main valve member. The second surface of the main valve member is under constant fluid pressure and the pilot valve member has fluid flow regulating surfaces flanking a control chamber which communicates with a compartment provided in the housing adjacent to the first surface of the main valve member. The flow regulating surfaces of the pilot valve member change the pressure of fluid in the compartment in response to axial displacement of the pilot valve member whereby the main valve member moves axially and determines the direction of movement of the carriage under the action of the hydraulic motor.

The novel features which are considered as characteristic of the invention are set forth in particular in the appended claims. The improved valve itself, however, both as to its construction and its mode of operation, together with additional features and advantages thereof, will be best understood upon perusal of the fol-

BRIEF DESCRIPTION OF THE DRAWING

FIG. 2 is an elevational view of an article which can be produced in the machine tool of FIG. 1.

DESCRIPTION OF THE PREFERRED EMBODIMENTS

Figure 1:
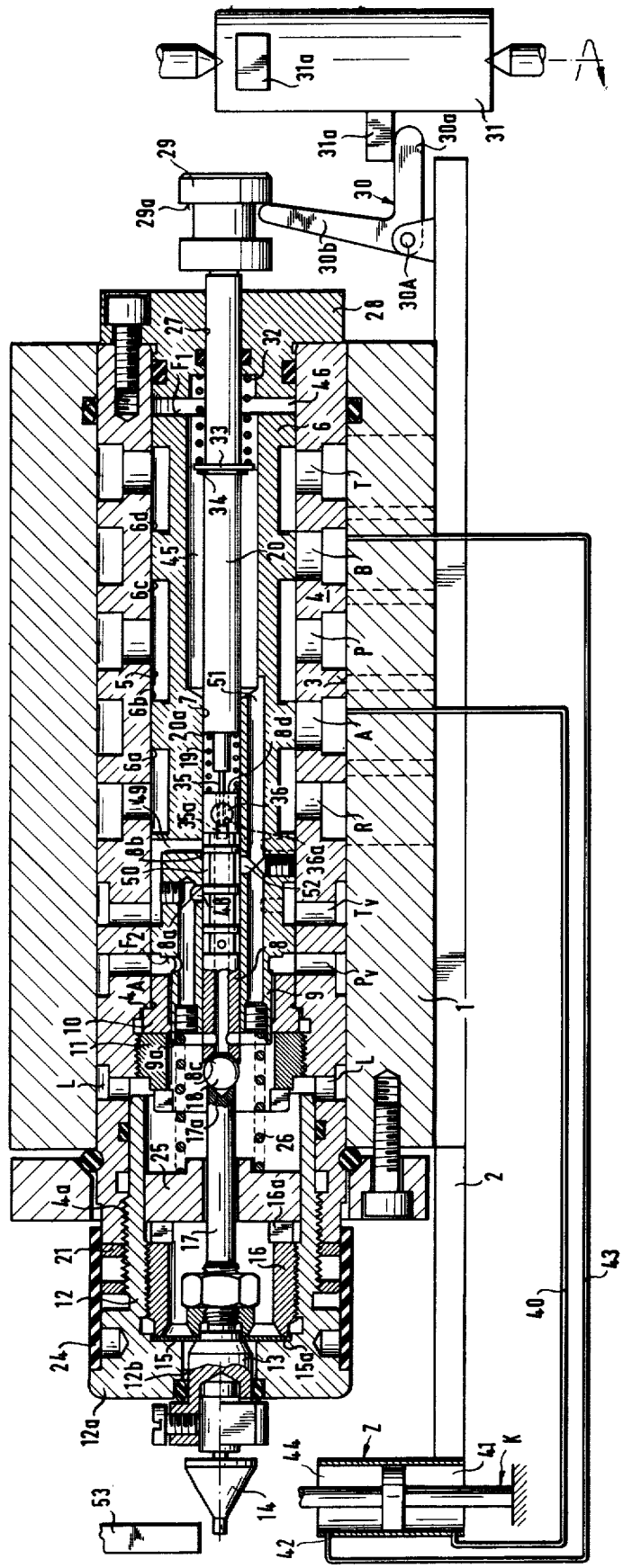
FIG. 1 is an axial sectional view of a tracking valve which embodies the invention, and further showing a portion of a machine tool wherein the valve can be put to use to control the movements of a carriage while tracking a template.

FIG. 1 illustrates a tracking valve which includes a housing or body 1 mounted on the cross slide or carriage 2 of a machine tool. The housing 1 has an axial bore 3 for a sleeve-like guide member 4 having groups of ports Pv, Tv, R, A, P, B and T. An axial bore 5 of the guide member 4 receives a reciprocable main valve member or spool 6 having annular fluid flow regulating shoulders 6a, 6b, 6c and 6d. The spool 6 has an axial bore 7 for a pilot valve member 8 which is provided with annular fluid flow regulating surfaces 8a and 8b flanking an annular control chamber 50.

The spool 6 has a cylindrical extension 9 which is surrounded by a sleeve-like guide element 10. The latter abuts against a shoulder 4A of the guide member 4 and is held in such axial position by a cylindrical nut 11 which meshes with the guide member 4. The guide member 4 further includes an internally threaded end portion 4a which receives the externally threaded cylindrical portion of a cupped insert 12. The bottom wall 12a of the insert 12 has an axial bore 12b for a holder 13 which separably supports a follower 14 arranged to track the outline of a pattern or template 53. The holder 13 is sealingly connected with the central portion of a membrane 15 whose outer marginal portion 15a is sealingly biased against the bottom wall 12a by a cylindrical screw 16. The holder 13 is further connected with a motion transmitting rod 17 which is shown in a starting position and has at its right-hand end a concave socket 17a for a sphere 18 which further extends into a similar concave socket 8c at the left-hand end of the pilot valve member 8. The sphere 18 is held in the sockets 17a, 8c by a helical spring 19 which bears against the right-hand end face 8d of the pilot valve member 8 and reacts against the annular surface 20a of a restoring or resetting linkage 20.

The insert 12 is held against rotation by a nut 21 which meshes with the end portion 4a of the guide member 4. A shield 24 surrounds the nut 21 to prevent unauthorized angular displacement of the insert 12.

The right-hand end face of the cylindrical screw 16 is provided with projections in the form of ribs 16a which serve as an abutment for a retainer 25. A helical spring 26 which reacts against the retainer 25 bears against the left-hand end surface 9a of the extension 9 of the spool 6, i.e., against that end surface which faces the follower 14.

The resetting linkage 20 extends outwardly through an axial bore 27 provided in a removable cover member 28 of the housing 1 and is provided with a coupling flange 29 which is outwardly adjacent to the cover member 28 and has an annular shoulder 29a engaged by the arm 30b of a motion-transmitting bell crank lever 30. The latter is pivotably mounted on the carriage 2, as at 30A, and its other arm 30a extends into the path of projections or lobes 31a on an indexible cam drum 31 which serves as a means for actuating the linkage 20. The drum 31 cooperates with the bell crank lever 30 to determine the axial position of the resetting linkage 20. The annular shoulder 29a of the flange 29 is biased against the arm 31b by a helical spring 32 which bears against the inner side of the cover member 28 and reacts against a retainer 33 which abuts against a split ring 34 recessed into a peripheral groove of the linkage 20.

The means for coupling the resetting linkage 20 with the pilot valve member 8 comprises a first screw 35 which is secured to the linkage 20 and a second screw 36 which is secured to the valve member 8. The head of the screw 36 is recessed into the right-hand end portion of the pilot valve member 8 and this screw has a transverse bore 36a for the shank of the screw 35. When the head 35a of the screw 35 engages the screw 36, and the housing 1 continues to move in a direction to the left, as viewed in FIG. 1 the pilot valve member 8 is arrested and reassumes its starting position relative to the housing 1 whereby it interrupts further movement of the valve housing 1 and of the carriage 2. The guide member 4 can be said to constitute a component part of the housing 1.

The operation:

The spool 6 is shown in its starting or neutral position in which its shoulders 6a, 6b seal the ports P of the guide member 4 from the ports A which communicate with a conduit 40 connected to the chamber 41 of a double-acting displacing cylinder 42 for the carriage 2. The ports A are equidistant from each other, as considered in the circumferential direction of the guide member 4. At the same time, the shoulders 6c, 6d of the spool 6 seal the ports P, T of the guide member 4 from the ports B communicating with a second conduit 43 connected to a second chamber 44 of the cylinder 42. The ports P, T, B are respectively equidistant from each other, as considered in the circumferential direction of the guide member 4. The pilot valve member 8 then assumes a position in which the control fluid pressure in a compartment 45, 46 between the cover member 28 and spool 6 produces a force acting on the relatively large right-hand end surface F1 of the spool 6 (this force equals the area of the end surface F1 multiplied by the control fluid pressure in compartment 45, 46) equals the force furnished by the spring 26 plus the force which is generated as a result of constant unregulated fluid pressure against the surface F2 which is smaller than the end surface F1. The pilot valve member 8 assumes such position when the carriage 2 moves the tracking valve toward the template 53 that the follower 14 engages the template and displaces the pilot valve member 8 to a small extent by way of the motion transmitting rod 17 and sphere 18 so that the pilot valve member 8 moves against the opposition of the spring 19. At such time, the holder 13 for the follower 14 slightly deforms the membrane 15 because the follower 14 causes the holder 13 to tilt about an axis which is located in the region of the connection of the holder with the inner marginal portion of the membrane 15. In other words, the parts 14, 13, 17 behave not unlike a two-armed lever the left-hand arm of which is pivoted by the template 53 so that the right-hand arm moves the pilot valve member 8 axially by way of the sphere 18. As the pilot valve member 8 moves in a direction to the right, as viewed in FIG. 1, and stresses the spring 19, the position of the surfaces 8a, 8b relative to the radial bores 48, 49 in the spool 6 changes in such a way that the cross-sectional area of the fluid path in the bore 48 is reduced and the cross-sectional area of the fluid path in the bore 49 increases. Consequently, the fluid pressure in the control chamber 50 between the surfaces 8a, 8b of the pilot valve member 8 decreases and the fluid pressure against the end surface F1 of the spool 6 also decreases because the compartment 45, 46 communicates with bores or chambers 51, 52 of the spool 6 and hence with the control chamber 50. This means that the forces acting on the spool 6 are in a state of equilibrium. The compartment adjacent to the surface F2 is in unchanged communication with the port Pv by which the control fluid is lead to bore 48.

As the carriage 2 moves the tracking valve relative to the template 53 and the follower 14 moves in a direction to the right, the pressure in the control chamber 50 decreases again and causes a decrease of fluid pressure acting on the end surface F1. Thus, the equilibrium of forces is destroyed and the spool 6 moves in a direction toward the cover member 28 whereby the shoulder 6a establishes communication between the ports A and the ports T (i.e., between the conduit 40 and the tank line). At the same time, the shoulder 6c establishes communication between the ports P (pump) and the ports B (second conduit 43). This causes the cylinder 42 to move the housing 1 away from the template 53 until the spool 6 reassumes its neutral position in which the ports A and B (the two conduits 40, 43) are sealed.

As the follower 14 moves in a direction to the left (i.e., if the configuration of the template 53 is such that the follower 14 is free to move to the left), the pressure of fluid in the control chamber 50 increases and causes an increase of fluid pressure in the compartment 45, 46 whereby the fluid pressure acting on the end surface F1 also increases. The spool 6 moves in a direction toward the follower 14 and its shoulders 6a, 6b establishes communication between the pump (ports P) and the first conduit 40 (ports A) on the one hand, as well as between the tank (ports T) and the second conduit 43 (ports B) on the other hand. Consequently, the cylinder 42 moves the follower 14 toward the template 53. The tool or tools on the carriage 2 move with the housing 1 so that the removal of material from a workpiece (e.g., a workpiece mounted in the chuck of a rotating work spindle) takes place in accordance with the axial movements of the follower 14 as determined by the configuration of the template.

FIG. 2 illustrates by way of example a workpiece or blank 60 which is to be converted into a shaped article 61, the outer form of which corresponds to the form of the template 53. As shown, such conversion necessitates the removal of large quantities of material from the blank 60. The removal takes place in several stages, namely, while the tool makes four passes a, b, c and d. The extent of movement of the tracking valve (and hence of the tool) is limited by the linkage 20 in the following way: When the arm 30a of the bell crank lever 30 reaches a projection 31a of the cam 31 (which is mounted on to the turning carriage not shown adjacent to the path of movement of the valve with the carriage 2), the position of the linkage 20 is fixed. Connection of valve member 8 with the linkage 20 via screws 35 and 36 effects a non-moving of the valve member 8 with the tracking valve towards the template 53. The tracking valve can only be moved so far — relatively to the valve member 8 — towards the template 53 as in the case the follower 14 touches the template 53. Such shifting of the pilot valve member 8 results in a reduction of fluid pressure acting on the end surface F1 of the spool 6 whereby the spool 6 interrupts the flow of fluid between the ports A, P and B, T which terminates the movement of the carriage 2 and housing 1 (and hence the movement of the tool or tools on the carriage 2) in a direction toward the template 53, that is into the axial direction of the cylinder Z, the piston rod K of which is connected stationarily to the turning carriage moving vertically to the drawing surface. Also the slide not shown for the cross carriage 2 and the cam drum 31 on the turning carriage are connected stationarily. If the turning carriage not shown is moving together with the cross carriage 2 vertically to the drawing surface, the tool or tools will make the first cut a. When the tool reaches the part a1 (FIG. 2) of the blank 60, the connection between the screw 35 and the pilot valve member 8 is interrupted because the follower 14 has reached the template 53 which thereupon controls further movements of the carriage 2 and the tracking valve thereon. The depth of cuts which the tool makes during conversion of the blank 60 into a workpiece 61 depends on the positions of projections 31a on the cam drum 31.

It will be noted that the smaller end surface F2 of the spool 6 is under constant fluid pressure (i.e., the same pressure as in the port Pv, and that the larger end surface F1 of the spool 6 is under a fluid pressure which is determined by the axial position of the pilot valve member 8. The surfaces 8a, 8b of the pilot valve member regulate the fluid pressure in the compartment 45, 46 adjacent to the surface F1. The just described arrangement prevents the impurities in control fluid from influencing the operation of the tracking valve. The exact manner in which the cylinder Z moves the carriage 2 and housing 1 relative to the template 53 forms no part of the invention.

If the pressure of control fluid drops for an unforseen reason, the spring 26 moves the spool 6 toward the cover member 28 so that the ports P communicate with the ports B and the ports T communicate with the ports A. The housing 1 moves away from the template 53 and the carriage 2 simultaneously moves the tool away from the blank 60. This reduces the likelihood of damage to the blank 60, tool, follower 14 and/or template 53.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a hydraulic tracking valve which controls the flow of a hydraulic fluid to and from a hydraulic motor, especially a motor which effects the movement of a tool-supporting carriage as a function of changes in the outline of a template, a combination comprising a housing; a main valve member reciprocably mounted in said housing and having a relatively large first radial surface and a relatively small second radial surface, said surfaces facing in opposite directions so that bodies of a pressurized fluid acting on said surfaces tend to move said main valve member in opposite directions and said second surface being under constant fluid pressure, said main valve member being further provided with an axial bore; a follower arranged to track the outline of a template; an axially movable pilot valve mounted in said axial bore of said main valve member and comprising a first end portion mechanically connected with said follower so as to be movable axially in first and second directions to thereby effect changes in fluid pressure acting against said first surface, said pilot valve member having a second end portion and fluid-regulating surfaces flanking a control chamber which communicates with a compartment provided in said housing adjacent to said first surface; adjustable resetting means for said pilot valve member coupled to said second end portion of the latter, said resetting means extending from said housing; and activating means for moving said pilot valve member by way of said resetting means.

2. A combination as defined in claim 1, wherein said activating means comprises an indexible drum having outwardly extending projections and motion transmitting means operatively connected with said resetting means outside of said housing and having a portion extending into the path of movement of said projections.

* * * * *